United States Patent Office 3,528,824
Patented Sept. 15, 1970

3,528,824
METHOD FOR PACKAGING RELISH
Robert G. Walker, Glenview, Ill., assignor to Kraftco Corporation, New York, N.Y., a corporation of Delaware
No Drawing. Filed Aug. 14, 1968, Ser. No. 752,494
Int. Cl. B65b 25/00
U.S. Cl. 99—171                6 Claims

ABSTRACT OF THE DISCLOSURE

A process is provided for packaging a sweet pickle relish mix into portion-controlled containers. The pickle particles in a sweet pickle relish mix are caused to collapse by osmotic pressure and heating. A thickening agent is provided to suspend the collapsed pickle particles and provide a uniform mix during filling of the mix into portion-controlled containers. After packaging, the thickening agent undergoes hydrolysis and viscosity of the mix is reduced while at the same time the collapsed pickle particles revert to their original size and shape.

---

The present invention relates generally to sweet pickle relish, and more particularly relates to a method for packaging sweet pickle relish in portion controlled containers.

Packaging of condiments in portion controlled amounts is desirable for certain users, such as restaurants or hospitals. This permits the user to provide the condiment to the customer without maintaining messy bulk containers. Sweet pickle relish, however, is a condiment that is difficult to fill into portion controlled flexible packages with high speed filling equipment. The particulate nature of the sweet pickle relish and its viscosity makes it difficult to pump the sweet relish mix through the small diameter tubes and nozzles orifices of existing high speed equipment. It would be desirable to provide a method for packaging sweet pickle relish into portion controlled containers.

Accordingly, it is an object of the present invention to provide a method for packaging condiments. It is another object of the invention to provide a method for packaging sweet pickle relish. It is a further object of the invention to provide a method of packaging sweet pickle relish into portion controlled containers.

These and other objects of the invention will become more apparent from the following detailed description.

In a method embodying various of the features of the present invention, sweet pickle relish is treated to provide a fluid suspension of collapsed pickle particles which may be readily pumped through known filling apparatus. In general, the treatment comprises providing a high sugar-low acid sweet pickle relish mix in combination with heating and the provision of a hydrolyzable thickening agent.

In a known method for manufacture of a sweet pickle relish mix, salt stock pickles are netted out of brine in which they are fermented. The pickles are then chopped. Salt stock pickles refer to cured cucumber pickles which are prepared by allowing fermentation of the cucumbers to proceed until the nutrients contained in the cucumbers are fully used by the fermentation organisms. During the fermentation process, the salt level of the brine is gradually raised until the brine contains from about 15 to about 22 percent salt.

After the salt stock pickles are chopped, the salt level is adjusted to about 3.5 percent by adding water to the chopped pickles. Water is then drained or pressed from the chopped pickles until the weight of the pickles is adjusted to from about 35 to about 60 percent of the original weight. Vinegar, sugar and spices are then added to provide the sweet relish mix. The level of sugar is usually from about 20 to about 40 percent and the vinegar is usually present at a level of greater than about 20 grains equivalent acetic acid. A grain is equivalent to 0.1 percent.

In the process of the present invention for packaging sweet pickle relish mix into portion controlled containers, a sweet pickle relish mix is provided containing a level of sugar of at least about 30 percent by weight. The sugar causes the pickle particles to collapse. The collapse of the pickle particles, after addition of sugar, is believed to be due to osmotic pressure created by the high concentration of sugar in the fluid surrounding the pickle particles. The higher the level of sugar the greater the degree of collapse of the pickle particles. Levels of sugar above about 42 percent by weight of the relish mix, however, provide an undesirably high level of sweetness. In accordance with the invention, further collapse of the pickle particles is provided by gently heating the pickle relish mix after addition of the sugar. Heating is effected so as to increase the temperature of the mix to at least about 120° F. Heating, however, should not exceed about 140° F. to avoid damaging the pickle particles.

The reduction in size of the pickle particles by the treatment of the invention is proportional to the original size of the particles. It is therefore preferred that the maximum dimension of any of the pickle particles be less than 1/4 inch to insure suitable operation of the filling machine.

Further, in accordance with the invention, an acid hydrolyzable thickening agent is provided in the sweet pickle relish mix. The acid hydrolyzable thickening agent provides body to the relish mix to suspend the collapsed pickle particles and provide a uniform relish mix during the filling process. A preferred thickening agent is pre-gelatinized starch. The pre-gelatinized starch may be provided from any suitable source, such as tapioca or cornstarch. Other acid hydrolyzable thickening agents which are suitable in the practice of the invention are vegetable gums, algin, alginates and carrageenan.

The thickening agent is generally added at a level of from about 0.30 to about 3.0 percent by weight of the relish mix. After the sweet pickle relish mix has been packaged into portion controlled containers, the acid hydrolyzable thickening agent undergoes hydrolysis and the viscosity of the mix is reduced as the thickening agent loses its thickening power. At the same time, the collapsed pickle particles revert back to their original size and shape as the osmotic pressure is equalized.

In the practice of the invention the sweet pickle relish mix should be packaged within a pre-determined time after addition of the sugar and thickening agent to the mix. In general, it is desirable that the relish mix be packaged within about two hours after addition of the sugar and thickening agent to the mix.

The following example further illustrates various of the features of the invention, but is intended to in no way limit the scope of the invention, which is defined in the appended claims.

EXAMPLE

A sweet pickle relish mix was prepared and packaged in accordance with the method of the invention by the following procedure: Salt stock pickles were chopped to provide cube-shaped particles measuring about one-eighth inch on each side. The chopped pickles were adjusted to a salt level of 4 percent and were then drained and pressed to provide pickle particles having a weight of 40 percent of the original salt stock pickle weight. To the chopped pickles was added sugar, vinegar, pre-gelatinized tapioca starch and spices, to provide the following mix at the indicated levels.

Ingredients: Wt. percent
- Sugar (sucrose) — 39.98
- Salt stock pickle particles — 42.53
- Spice mix — 4.70
- Pre-gelatinized tapioca starch — 1.25
- Salt — 0.50
- Vinegar (200 grain) — 11.04

The above mix had an acidity of 23.5 grains and a sugar level of 40 percent by weight. Immediately after adding the sugar, vinegar, pre-gelatinized starch and spices to the chopped pickle particles, the mixture was slowly heated, while stirring, to a temperature of 130° F. At this time the combination of heat and high sugar in the mix had caused the salt stock pickle particles to collapse and exude their liquid. The pre-gelatinized starch caused the liquid to thicken and the collapsed pickle particles were suspended in the thickened liquid.

The sweet pickle relish mix was then pumped to filling apparatus and was packaged into plastic pouches measuring 1¾ inches by 4 inches to provide portion controlled amounts of sweet pickle relish weighing about ½ ounce. After storage for a period of one day, the collapsed pickle particles had nearly resumed their original ⅛ inch cube shape. The pre-gelatinized tapioca starch had been hydrolyzed to an extent such that a non-gummy, natural appearing, sweet pickle relish was provided.

Various of the features of the invention are defined in the appended claims.

What is claimed is:

1. A method for packaging sweet pickle relish into containers comprising, providing a sweet pickle relish mix containing pickle particles, sugar and a hydrolyzable thickening agent, heating said mixture so as to cause collapse of said pickle particles, filling said mixture through apparatus having a restricted orifice while said pickle particles are collapsed into containers and permitting said collapsed particles to resume their original shape.

2. A method in accordance with claim 1 wherein said sugar is present at a level of at least about 30 percent by weight of the sweet pickle relish mix.

3. A method in accordance with claim 1 wherein said sweet pickle relish mix is heated to a temperature of from about 120° F. to about 140° F.

4. A method in accordance with claim 1 wherein said hydrolyzable thickening agent is selected from pre-gelatinized starch, vegetable gums, algin, alginate or carrageenan.

5. A method in accordance with claim 1 wherein said thickening agent is pre-gelatinized starch.

6. A method in accordance with claim 1 wherein said pickle particles have a maximum dimension of one-quarter inch.

References Cited

UNITED STATES PATENTS 3,142,574    7/1964    Anderson et al. _____ 99—102
3,443,964    5/1969    Marotta et al. _____ 99—101 X FRANK W. LUTTER, Primary Examiner W. L. MENTLIK, Assistant Examiner U.S. Cl. X.R.
99—144